S. McAFFERTY.
Improvement in Sewing-Machine Casters.
No. 129,354. Patented July 16, 1872.
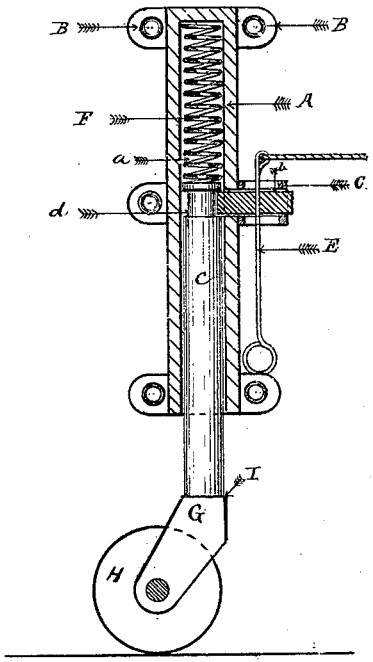
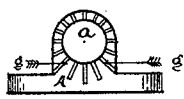
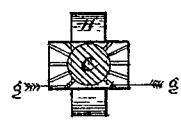
Witnesses:
Richard Gerner
Franklin Darrit
Inventor:
Samuel McAfferty
PER Henry Gerner
Attorney.

UNITED STATES PATENT OFFICE.

SAMUEL McAFFERTY, OF NORTH SHENANGO, PENNSYLVANIA.

IMPROVEMENT IN SEWING-MACHINE CASTERS.

Specification forming part of Letters Patent No. 129,354, dated July 16, 1872.

Specification describing certain Improvements in Casters for Sewing-Machines, invented by SAMUEL McAFFERTY, of North Shenango, county of Crawford, State of Pennsylvania.

The object of my invention is to produce casters for sewing-machines that will not only allow machines to be moved about, but will prevent the machine from moving or turning upon the spindle when the operator is working it, which is the case with the ordinarily-used casters on sewing-machines.

In order more fully to describe my invention I refer to the accompanying drawing.

Figure 1 is a vertical cut-section of my invention. Fig. 2 is a lower-end view of the caster, showing the grooves cut therein. Fig. 3 is a plan view of the caster-guide, showing the grooves cut therein.

A represents the sleeve of a caster, having through the center a hole, $a$, running up nearly to the top. On the outer side of the sleeve A are two or more flanges, B, for the purpose of securing it firmly to the leg of the machine by screws or other suitable means. At or near the center of the sleeve A is another flange, C, having a groove, $b$, cut therein for the insertion of a sliding catch, D. This sliding catch enters the sleeve A, and, passing midway through the hole $a$, is held in the desired position by spring E. This spring is fastened to the outside of the sleeve, and acts as a means for withdrawing the sliding catch. In the upper part of the hole $a$ of the sleeve A is inserted a spiral spring, F. Letter G is the caster proper, provided with the spindle $c$. This spindle has, at or near its top, a groove, $d$, cut therein. H is the caster-roller.

To apply or operate my invention the sleeve A is first securely fastened to one of the legs of the sewing-machine in such a way that the spring E faces toward the inner sides of the machine. The spindle $c$ is then inserted into the hole $a$. As the spindle passes up the head of the same comes in contact with the sliding catch D and forces the same to move outward to allow the head to pass, which, when done, the catch (through the action of the spring E) enters the groove $d$, thereby holding the caster proper G in its place and preventing it from dropping out, but allowing it to turn in any direction when the machine is moved about.

When the machine is to be operated the sliding catch D is drawn out, to relieve it of its hold on the spindle $c$, by aid of a wire or cord fastened to the spring E, and within reach of the operator. This being done the machine gradually descends, by aid of the spiral spring F, until the lower part of the sleeve A rests upon the shoulder I of the caster, where it supports the whole machine firmly and solidly. The caster is prevented from turning or the machine from turning because of the grooves $g$ on the shoulder I and lower part of the sleeve A.

When the machine is to be moved all that is necessary is to raise the machine high enough to allow the casters to drop down, aided by the spiral spring F, until the grooves are caught by the sliding catches and there held in their positions.

Having thus described my invention, I desire to claim—

The sleeve A with the hole $a$ and flanges B C, groove $b$, sliding catch D, springs E and F, in combination with the spindle $c$, groove $d$, and caster D, substantially as and for the purpose hereinbefore set forth.

SAMUEL McAFFERTY.

Witnesses:
  J. L. BISHOP,
  MOSES BISHOP.